US011740392B1

(12) United States Patent
Ouderkirk et al.

(10) Patent No.: US 11,740,392 B1
(45) Date of Patent: *Aug. 29, 2023

(54) OPTICAL LENS ASSEMBLIES AND RELATED METHODS

(71) Applicant: META PLATFORMS TECHNOLOGIES, LLC, Menlo Park, CA (US)

(72) Inventors: Andrew John Ouderkirk, Kirkland, WA (US); Katherine Marie Smyth, Seattle, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/357,531

(22) Filed: Jun. 24, 2021

Related U.S. Application Data

(63) Continuation of application No. 16/018,752, filed on Jun. 26, 2018, now Pat. No. 11,048,075.

(Continued)

(51) Int. Cl.
*G02B 3/14* (2006.01)
*G02C 7/06* (2006.01)
(Continued)

(52) U.S. Cl.
CPC .............. *G02B 3/14* (2013.01); *G02B 1/10* (2013.01); *G02B 3/12* (2013.01); *G02B 26/004* (2013.01);
(Continued)

(58) Field of Classification Search
CPC ... G02B 3/14; G02B 3/12; G02B 3/04; G02B 1/10; G02B 26/004; G02B 26/06;
(Continued)

(56) References Cited

U.S. PATENT DOCUMENTS

| 60,109 A | 11/1866 | Woodward |
| 3,571,555 A | 3/1971 | Townes et al. |

(Continued)

FOREIGN PATENT DOCUMENTS

| KR | 10-2011-0107812 A | 10/2011 |
| KR | 101675093 B1 | 11/2016 |

(Continued)

OTHER PUBLICATIONS

Final Office Action dated Sep. 21, 2020 for U.S. Appl. No. 16/059,091, filed Aug. 9, 2018, 18 Pages.

(Continued)

*Primary Examiner* — Joseph P Martinez
*Assistant Examiner* — Mitchell T Oestreich
(74) *Attorney, Agent, or Firm* — Greenberg Traurig, LLP

(57) ABSTRACT

The disclosed optical lens assemblies may include a structural support element, a deformable element coupled to the structural support element, and a deformable medium positioned between the deformable element and the structural support element. The deformable element may include a base element that, when deformed, alters an optical property of the optical lens assembly. The deformable element may have a non-uniform stiffness. Related methods of fabricating an optical lens assembly are also disclosed.

20 Claims, 6 Drawing Sheets

Related U.S. Application Data

(60) Provisional application No. 62/650,254, filed on Mar. 29, 2018.

(51) Int. Cl.
  *G02B 27/01* (2006.01)
  *G02B 26/06* (2006.01)
  *G02B 26/08* (2006.01)
  *G02B 3/12* (2006.01)
  *G02F 1/1362* (2006.01)
  *G02B 1/10* (2015.01)
  *G02B 26/00* (2006.01)
  *G02B 3/04* (2006.01)
  *G02B 3/00* (2006.01)

(52) U.S. Cl.
  CPC ......... *G02B 26/06* (2013.01); *G02B 26/0875* (2013.01); *G02B 27/017* (2013.01); *G02B 27/0172* (2013.01); *G02C 7/06* (2013.01); *G02F 1/136277* (2013.01); *G02B 3/04* (2013.01); *G02B 2003/0093* (2013.01); *G02B 2027/011* (2013.01); *G02B 2027/0107* (2013.01); *G02B 2027/0178* (2013.01)

(58) Field of Classification Search
  CPC .............. G02B 26/0875; G02B 27/017; G02B 27/0172; G02B 2003/0093; G02B 2027/0107; G02B 2027/011; G02B 2027/0178; G02C 7/06; G02F 1/136277
  USPC ....................................................... 359/664
  See application file for complete search history.

(56) References Cited

U.S. PATENT DOCUMENTS

| | | |
|---|---|---|
| 3,797,922 A | 3/1974 | Plummer |
| 4,477,158 A | 10/1984 | Pollock et al. |
| 5,154,862 A | 10/1992 | Reagan et al. |
| 5,225,244 A | 7/1993 | Aharoni et al. |
| 5,663,779 A | 9/1997 | Karasawa |
| 5,956,183 A | 9/1999 | Epstein et al. |
| 6,081,388 A | 6/2000 | Widl |
| 6,420,441 B1 | 7/2002 | Allen et al. |
| 6,918,670 B2 | 7/2005 | Blum et al. |
| 7,008,054 B1 | 3/2006 | Kurtin et al. |
| 7,118,219 B2 | 10/2006 | Itagaki |
| 7,125,508 B2 | 10/2006 | Ide et al. |
| 7,864,440 B2 | 1/2011 | Berge |
| 7,866,816 B2 | 1/2011 | Kurtin |
| 8,210,678 B1 | 7/2012 | Farwig |
| 8,441,737 B2 | 5/2013 | Buch et al. |
| 9,292,085 B2 | 3/2016 | Bennett et al. |
| 10,187,568 B1 | 1/2019 | Tran et al. |
| 10,409,089 B2 | 9/2019 | Pugh et al. |
| 10,698,224 B1 | 6/2020 | Cooke et al. |
| 10,754,145 B1 | 8/2020 | Ouderkirk et al. |
| 10,881,287 B1 | 1/2021 | Ouderkirk et al. |
| 10,928,558 B1 | 2/2021 | Cooke et al. |
| 10,928,656 B1 | 2/2021 | Smyth et al. |
| 10,962,791 B1 | 3/2021 | Ouderkirk et al. |
| 11,011,739 B1 | 5/2021 | Ouderkirk et al. |
| 11,048,075 B1* | 6/2021 | Ouderkirk .......... G02B 27/0172 |
| 2003/0003295 A1 | 1/2003 | Dreher et al. |
| 2003/0054115 A1 | 3/2003 | Albano et al. |
| 2003/0067245 A1 | 4/2003 | Pelrine et al. |
| 2003/0083433 A1 | 5/2003 | James et al. |
| 2003/0128496 A1 | 7/2003 | Allen et al. |
| 2004/0096672 A1 | 5/2004 | Lukas et al. |
| 2006/0024976 A1 | 2/2006 | Waldfried et al. |
| 2006/0073424 A1 | 4/2006 | Koveshnikov et al. |
| 2006/0228092 A1 | 10/2006 | Hebrink et al. |
| 2006/0247404 A1 | 11/2006 | Todd |
| 2007/0035839 A1 | 2/2007 | Ibuki |
| 2008/0038561 A1 | 2/2008 | Yoshizawa et al. |
| 2008/0049361 A1 | 2/2008 | Boek et al. |
| 2008/0084532 A1 | 4/2008 | Kurtin |
| 2008/0088793 A1 | 4/2008 | Sverdrup et al. |
| 2008/0123049 A1 | 5/2008 | Volk |
| 2008/0144185 A1 | 6/2008 | Wang et al. |
| 2008/0170299 A1 | 7/2008 | Kawabata |
| 2008/0171431 A1 | 7/2008 | Yu et al. |
| 2008/0290435 A1 | 11/2008 | Oliver et al. |
| 2008/0291394 A1 | 11/2008 | Ishak |
| 2009/0015786 A1 | 1/2009 | Harris |
| 2009/0027778 A1 | 1/2009 | Wu et al. |
| 2009/0096106 A1 | 4/2009 | Vrtis et al. |
| 2009/0289529 A1 | 11/2009 | Ito et al. |
| 2009/0304924 A1 | 12/2009 | Gadgil |
| 2010/0075056 A1 | 3/2010 | Axisa et al. |
| 2010/0109486 A1 | 5/2010 | Polyakov et al. |
| 2010/0168409 A1 | 7/2010 | Fujita |
| 2010/0202054 A1 | 8/2010 | Niederer |
| 2010/0238400 A1 | 9/2010 | Volk |
| 2011/0075096 A1 | 3/2011 | Ishak et al. |
| 2011/0085131 A1 | 4/2011 | Gupta et al. |
| 2011/0096411 A1 | 4/2011 | Henriksen et al. |
| 2011/0149410 A1 | 6/2011 | Blum |
| 2011/0176105 A1 | 7/2011 | Harris |
| 2011/0179861 A1 | 7/2011 | Grange et al. |
| 2011/0235326 A1 | 9/2011 | Veh et al. |
| 2011/0294305 A1 | 12/2011 | Jacobs et al. |
| 2012/0029416 A1 | 2/2012 | Parker et al. |
| 2012/0032559 A1 | 2/2012 | Hino et al. |
| 2012/0041553 A1 | 2/2012 | Gupta et al. |
| 2012/0044571 A1 | 2/2012 | Mukawa |
| 2012/0063000 A1* | 3/2012 | Batchko .................. G02B 5/20 |
| | | 359/666 |
| 2012/0087015 A1 | 4/2012 | Nibauer et al. |
| 2012/0092775 A1 | 4/2012 | Duston et al. |
| 2012/0170920 A1 | 7/2012 | Moreau et al. |
| 2012/0229754 A1 | 9/2012 | Iyer et al. |
| 2012/0250151 A1 | 10/2012 | Lee et al. |
| 2012/0287512 A1 | 11/2012 | Egan et al. |
| 2013/0171546 A1 | 7/2013 | White et al. |
| 2013/0176628 A1 | 7/2013 | Batchko et al. |
| 2013/0300635 A1 | 11/2013 | White et al. |
| 2014/0009039 A1 | 1/2014 | Jenninger et al. |
| 2014/0078586 A1 | 3/2014 | Spurgeon et al. |
| 2014/0153102 A1 | 6/2014 | Chang |
| 2014/0186215 A1 | 7/2014 | Shinta et al. |
| 2014/0227548 A1 | 8/2014 | Myrick |
| 2014/0300857 A1 | 10/2014 | Cohen-Tannoudji et al. |
| 2014/0312737 A1 | 10/2014 | Jenninger et al. |
| 2015/0062719 A1 | 3/2015 | Kyung et al. |
| 2015/0116656 A1 | 4/2015 | Stevens et al. |
| 2015/0138110 A1 | 5/2015 | Yairi et al. |
| 2015/0146161 A1 | 5/2015 | Rigato et al. |
| 2015/0302990 A1 | 10/2015 | Ghosh et al. |
| 2015/0323812 A1 | 11/2015 | Ishak et al. |
| 2016/0004099 A1 | 1/2016 | Steven et al. |
| 2016/0091635 A1 | 3/2016 | Ibuki et al. |
| 2016/0187985 A1 | 6/2016 | Lim et al. |
| 2017/0021385 A1 | 1/2017 | Smith et al. |
| 2017/0045649 A1 | 2/2017 | Bolis |
| 2017/0160600 A1 | 6/2017 | Galstian et al. |
| 2017/0177106 A1 | 6/2017 | Kihara |
| 2017/0184848 A1 | 6/2017 | Vallius |
| 2017/0188021 A1 | 6/2017 | Lo et al. |
| 2017/0192595 A1 | 7/2017 | Choi et al. |
| 2017/0261653 A1 | 9/2017 | Peyman |
| 2017/0299956 A1 | 10/2017 | Holland et al. |
| 2017/0317269 A1 | 11/2017 | Zhang et al. |
| 2017/0336641 A1 | 11/2017 | Von Und Zu Liechtenstein |
| 2018/0255250 A1 | 9/2018 | Price et al. |
| 2018/0275394 A1 | 9/2018 | Yeoh et al. |
| 2018/0335649 A1 | 11/2018 | Tsai |
| 2019/0173128 A1 | 6/2019 | Visco et al. |
| 2019/0243123 A1 | 8/2019 | Bohn |
| 2019/0296218 A1 | 9/2019 | Ouderkirk et al. |
| 2019/0302479 A1 | 10/2019 | Smyth et al. |

(56) References Cited

U.S. PATENT DOCUMENTS

| | | |
|---|---|---|
| 2020/0166742 A1 | 5/2020 | Peyman |
| 2020/0251709 A1 | 8/2020 | Lee et al. |

FOREIGN PATENT DOCUMENTS

| | | |
|---|---|---|
| WO | 2008/156166 A1 | 12/2008 |
| WO | 2010/078666 A1 | 7/2010 |
| WO | 2010/104904 A2 | 9/2010 |
| WO | 2019/183431 A1 | 9/2019 |
| WO | 2019/190887 A1 | 10/2019 |

OTHER PUBLICATIONS

Guha I.F., et al., "Creating Nanoscale Emulsions Using Condensation," Nature Communications, Nov. 8, 2017, vol. 8, Article 1371, pp. 1-7, Retrieved from the Internet: URL: https://lfb.sharepoinl.com/:b:/r/sites/or-sile/arc/optics-anddisplay/Docs%20Public/Invention%20Proposals/Nano%20emulsions%20formed%20by%20vapor"/oOcondensation.pdf?csf=1&e=IMi042.

Non-Final Office Action dated Apr. 8, 2020 for U.S. Appl. No. 16/059,091, filed Aug. 9, 2018, 54 Pages.

John M. Cooke, et al.; Optical Lens Assemblies, Head-Mounted Displays, And Related Methods; U.S. Appl. No. 16/021,580, filed Jun. 28, 2018.

Andrew John Ouderkirk, et al.; Electroactive Polymer Devices, Systems, And Methods; U.S. Appl. No. 16/035,562, filed Jul. 13, 2018.

"Adjustable Reading Glasses," Retrieved from internet URL: https://adlens.com/.

International Preliminary Report on Patentability received for PCT Application Serial No. PCT/US2019/023485 dated Oct. 8, 2020, 8 pages.

Merriam-Webster, "Porosity", URL: https://www.merriam-webster.com/dictionary/porosity, retrieved on Apr. 8, 2020, pp. 1-8.

International Search Report and Written Opinion received for PCT Application Serial No. PCT/US2019/023484 dated Jul. 3, 2019, 9 pages.

International Preliminary Report on Patentability received for PCT Application Serial No. PCT/US2019/023484 dated Oct. 1, 2020, 8 pages.

International Search Report and Written Opinion received for PCT Application Serial No. PCT/US2019/023485 dated Jul. 4, 2019, 11 pages.

Notice of Allowance received for U.S. Appl. No. 15/972,794 dated Oct. 16, 2020, 22 pages.

Notice of Allowance received for U.S. Appl. No. 15/992,731 dated Nov. 18, 2020, 37 pages.

Final Office Action received for U.S. Appl. No. 16/106,945 dated Nov. 24, 2020, 94 pages.

Final Office Action received for U.S. Appl. No. 16/018,752 dated Nov. 30, 2020, 41 pages.

Notice of Allowance received for U.S. Appl. No. 16/018,746 dated Nov. 3, 2020, 39 pages.

Notice of Allowance received for U.S. Appl. No. 16/021,580 dated Dec. 9, 2020, 68 pages.

Preinterview First Office Action received for U.S. Appl. No. 16/021,650 dated Feb. 1, 2021, 47 pages.

Gurvich, Mark R., "On Characterization of Anisotropic Elastomeric Materials for Structural Analysis", Rubber Chemistry and Technology, vol. 77, No. 1, 2004, pp. 115-130.

Non-Final Office Action received for U.S. Appl. No. 16/106,945 dated Mar. 30, 2021, 111 pages.

Notice of Allowance received for U.S. Appl. No. 16/018,752 dated Mar. 10, 2021, 32 pages.

Communication pursuant to Article 94(3) EPC received for EP Patent Application Serial No. 19715707.6 dated Mar. 22, 2021, 5 page.

Non-Final Office Action received for U.S. Appl. No. 16/016,428 dated Mar. 12, 2021, 56 pages.

Non-Final Office Action received for U.S. Appl. No. 16/035,562 dated Jun. 10, 2021, 36 pages.

Non-Final Office Action received for U.S. Appl. No. 16/016,428 dated Jun. 16, 2021, 43 pages.

Non-Final Office Action received for U.S. Appl. No. 16/013,837 dated Jan. 23, 2020, 22 pages.

Notice of Allowance received for U.S. Appl. No. 16/013,837 dated Apr. 14, 2020, 14 pages.

Preinterview First Office Action received for U.S. Appl. No. 15/992,731 dated Sep. 27, 2019, 17 pages.

Final Office Action received for U.S. Appl. No. 15/992,731 dated Jun. 2, 2020, 25 pages.

Non-Final Office Action received for U.S. Appl. No. 15/992,731 dated Aug. 24, 2020, 27 pages.

Examiner-Initiated Interview Summary received for U.S. Appl. No. 16/008,635 dated Apr. 20, 2020, 3 pages.

Notice of Allowance received for U.S. Appl. No. 16/008,635 dated May 4, 2020, 32 pages.

Non-Final Office Action received for U.S. Appl. No. 16/106,945 dated Apr. 16, 2020, 59 pages.

Non-Final Office Action received for U.S. Appl. No. 16/041,634 dated Jul. 30, 2020, 24 pages.

Notice of Allowance received for U.S. Appl. No. 16/041,634 dated Aug. 28, 2020, 31 pages.

Preinterview First Office Action received for U.S. Appl. No. 16/018,752 dated Dec. 16, 2019, 19 pages.

Preinterview First Office Action received for U.S. Appl. No. 16/018,746 dated Jul. 14, 2020, 20 pages.

Notice of Allowance Action received for U.S. Appl. No. 16/018,746 dated Sep. 17, 2020, 24 pages.

Preinterview First Office Action received for U.S. Appl. No. 16/021,580 dated Aug. 4, 2020, 48 pages.

Press Kit Home, "Adaptive glasses", accessed at http://tvc.utah.edu, as accessed on Mar. 13, 2018, 5 pages.

Billah et al., "Microstructure Evolution and Electrical Characterization of Lanthanum doped Barium Titanate (BaTi03) Ceramics", International Conference on Mechanical Engineering, AIP Cont. Proc. 1754, accessed on Jul. 12, 2016, pp. 030006-1-030006-7.

Cao et al., Grain Size and Domain Size Relations in Bulk Ceramic Ferroelectric Materials, J. Phys. Chem Solids vol. 57, No. 10, pp. 1499-1505, 1996.

Ding et al., "Surface profiling of an aspherical liquid lens with a varied thickness membrane," Optics Express 3122-3132, vol. 25, No. 4 (Feb. 6, 2017).

He et al., Linear Electro-Optic Properties of Orthorhombic PZN-8%PT Single Crystal, IEEE Transactions on Ultrasonics, Ferroelectrics, and Frequency Control, vol. 58, No. 6 (Jun. 1, 2011).

Knapp et al., "Understanding Zirconia Crown Esthetics and Optical Properties" Inclusive magazine accessed at http://glidewelldental.com/education/inclusive-dental-implant-magazine-volume-2-issue-4/, as accessed on Jun. 12, 2018, vol. 2, Issue 4, 17 pages.

Optotune, "Focus tunable lenses", accessed at http://www.optotune.com/technology/focus-tunable-lenses, accessed on Mar. 13, 2018, 2 pages.

Polight, "How does it work", accessed at http://www.polight.com/technology-and-products/how-does-it-work/default.aspx, accessed on Mar. 13, 2018, 3 pages.

Uzoom Adlens, "Adjustable Lens Glasses: How They Work", accessed at https://adlens.com/how-it-works/, accessed an Mar. 28, 2018, 9 pages.

Piezo Technology, "Highly Reliable Multilayer Piezo Actuators", accessed on https://www.piceramic.com/en/piezo-technology/picma/, accessed on Mar. 14, 2018, 8 pages.

Piezo Technology, "Displacement Modes of Piezoelectric Actuators", accessed on https://www.piceramic.com/en/piezo-technology/properties-piezo-actuators/displacement-modes/, accessed on Mar. 14, 2018, 12 pages.

Jiang et al., "Transparent Electro-Optic Ceramics and Devices", Proceedings vol. 5644, Optoelectronic devices and integration, accessed at https://doi.org/10.1117/12.582105, Jan. 17, 2005, 15 Pages.

(56) References Cited

OTHER PUBLICATIONS

Keplinger et al., "Stretchable, Transparent, Ionic Conductors", Science Magazine, vol. 341, DOI:10.1126/science.1240228, Accessed on Aug. 30, 2013, pp. 984-987.
Kong et al., "Transparent Ceramic Materials", Transparent Ceramics, Topics in Mining, Metallurgy, and Materials Engineering, Ch. 2, DOI: 10.1007/978-3-319-18956-7_2, Springer international Publishing Switzerland 2015, pp. 29-91.
Patra et al., "Comparison on Optical Properties of Pure and Doped Lithium Tetraborate Single Crystals and Glasses", Solid State Physics: Proceedings of the 56th DAE Solid State Physics Symposium 2011, AIP Conf. Proc. 1447, Dec. 11, 2012, pp. 1335-1336.
Riegler et al., "Index Matching Silicone for High Brightness LED Packaging", IMAPS International Conference on Device Packaging Mar. 13-16, Scottsdale AZ., Accessed on Mar. 18, 2005, 17 Pages.
Shian et al., Tunable Lenses using Transparent Dielectric Elastomer Actuators, Optics Express, vol. 21, No. 7 (Apr. 2, 2013).
Hocking, L.M., "The effect of slip on the motion of a sphere close to a wall and of two adjacent spheres", Journal of Engineering Math., vol. 7 (1973), pp. 207-221.
Wang et al., "A Highly Stretchable, Transparent, and Conductive Polymer", Science Advances vol. 3, No. 3, e1602076, Mar. 10, 2017, pp. 1-10.
APC International, Lid., "Piezoelectric Materials, New Materials, Piezo theory", accessed at www.americanpiezo.com/knowledge-center/piezo-theory/new-materials/html, accessed on Mar. 15, 2018, 1 page.
Zhao et al., "Spherical aberration free liquid-filled tunable lens with variable thickness membrane," Optics Express vol. 23, No. 16, accessed at https://doi.org/10.1364/0.23.021264, accessed on Aug. 5, 2015, pp. 21264-21278.
Andrew J. Ouderkirk, et al.; Apparatuses, Systems, And Methods For Adjusting Fluid Lenses; U.S. Appl. No. 16/008,635, filed Jun. 14, 2018.
Katherine Marie Smyth, et al.; Optical Lens Assemblies, Head-Mounted Displays, and Related Methods; U.S. Appl. No. 16/021,650, filed Jun. 28, 2018.
Andrew John Ouderkirk, et al.; Multi-Element Prescription Lenses With Eye-Tracking; U.S. Appl. No. 16/041,634, filed Jul. 20, 2018.
Andrew John Ouderkirk, et al.; Electroactive Polymer Devices And Nanovoided Polymer Materials And Methods And Systems For Fabrication Thereof; U.S. Appl. No. 16/106,945, filed Aug. 21, 2018.
Andrew John Ouderkirk, et al.; Nanovoided Electroactive Polymer Devices, Systems, And Methods; U.S. Appl. No. 16/041,858, filed Jul. 23, 2018.
Andrew John Ouderkirk, et al.; Electroactive Polymer Devices, Systems, And Methods; U.S. Appl. No. 16/059,091, filed Aug. 9, 2018.
Andrew John Ouderkirk, et al.; Optical Devices, Systems, And Methods Of Manufacturing; U.S. Appl. No. 62/646,900, filed Mar. 22, 2018.
Andrew John Ouderkirk, et al.; Optical Devices, Systems, And Methods Of Manufacturing; U.S. Appl. No. 62/650,254, filed Mar. 29, 2018.
Katherine Marie Smyth, et al.; Optical Lens Assemblies And Related Methods; U.S. Appl. No. 16/018,746, filed Jun. 26, 2018.
Katherine Marie Smyth, et al.; Systems And Methods For Actuation Of Asymmetric Optical Elements; U.S. Appl. No. 15/992,731, filed May 30, 2018.
Andrew John Ouderkirk, et al.; Optical Lens Assemblies And Related Methods; U.S. Appl. No. 16/018,752, filed Jun. 26, 2018.
John M. Cooke, et al.; Optical Lens Assemblies, Head-Mounted Displays, And Methods Of Altering Optical Properties Of Optical Lens Assemblies; U.S. Appl. No. 16/013,837, filed Jun. 20, 2018.
Katherine Marie Smyth, et al.; Optical Lens Assemblies, Head-Mounted Displays, And Related Methods; U.S. Appl. No. 16/016,428, filed Jun. 22, 2018.

* cited by examiner

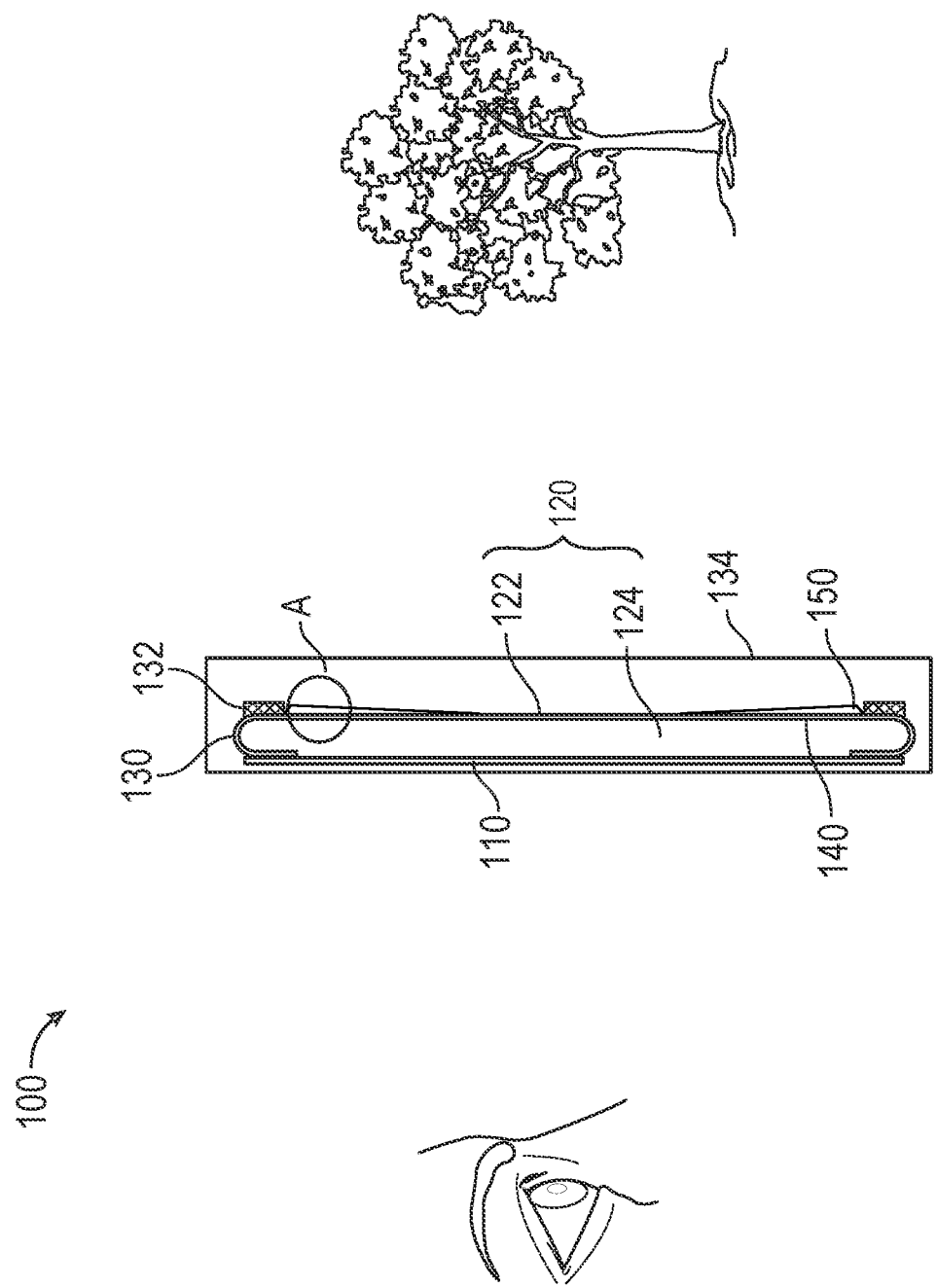

OPTICAL LENS ASSEMBLIES AND RELATED METHODS

CROSS REFERENCE TO RELATED APPLICATION

This application is a continuation of U.S. patent application Ser. No. 16/018,752, filed Jun. 26, 2018, which claims the benefit of U.S. Provisional Application No. 62/650,254, filed Mar. 29, 2018, the entire disclosure of each of which is incorporated herein by this reference.

BACKGROUND

Adjustable-lens systems may be useful in a variety of devices, including eyeglasses, cameras, instrumentation, and virtual or augmented reality ("VR/AR") systems, such as to adjust the focus of a display element (e.g., screen) or of a real-world image viewed by a user. One example of an adjustable-lens system is a liquid lens assembly. As accommodative elements, liquid lenses may be varifocal, may have high transmissivity, and, with proper optical design, may achieve low off-axis aberration and distortion for high image quality over a range of optical powers.

Liquid lenses may often include a flexible membrane that is directly coupled to a rigid backplane and a fluid that is disposed between the rigid backplane and the membrane. Inducing a change in fluid pressure may result in a convex or concave lens shape, which may be defined by a flexible membrane. The lens shape formed by the shaped flexible membrane may not be ideal for some applications. For example, the edge of the lens may have a shape that is distorted by forces applied by attachments of the membrane to mechanical support structures. In the central region of the lens, the shape is often spherical. However, aspherical shapes are sometimes preferred since they generally have a thinner profile and higher optical quality than spherical shapes. In addition, membranes formed by molding (e.g., by an injection molding or compression molding process) may use expensive tooling that is difficult to modify for customization, and the molding process may introduce variability in stress, strain, creep, and elastic modulus in the membranes.

SUMMARY

As will be described in greater detail below, the present disclosure describes optical lens assemblies including deformable elements that have a non-uniform stiffness.

For example, an optical lens assembly may include a structural support element, a deformable element coupled to the structural support element, and a deformable medium positioned between the deformable element and the structural support element. The deformable element may include a base element that, when deformed, alters an optical property of the lens assembly. The deformable element may have a non-uniform stiffness.

In some examples, the deformable element may also include a coating applied to at least a portion of the base element such that the stiffness of a first region of the deformable element is different from a stiffness of a second region of the deformable element. A thickness of the coating in the first region may be greater than a thickness of the coating in the second region, and the stiffness of the first region may be greater than the stiffness of the second region. The coating may be applied in a manner that causes the deformable element to have an aspherical shape, a spherical shape, or a parabolic shape when the deformable element is in a relaxed state, and/or the deformable element to have an aspherical shape, a spherical shape, or a parabolic shape when the deformable element is actuated and deformed. At least a portion of the coating may be diffused into or crosslinked with the base element. The coating may be applied to a surface of the base element facing the deformable medium, and a refractive index of the coating may be at least substantially similar to a refractive index of the deformable medium. In additional examples, the coating may be applied to a surface of the base element opposite the deformable medium. A mechanical stress of the coating may be within about five percent of a mechanical stress of the base element and/or less than about ninety-five percent of a mechanical stress of the base element.

In some examples, the deformable element may include a polymer material and may exhibit a substantially uniform thickness. A first region of the deformable element may be cross-linked, and a second region may not be cross-linked, or may be cross-linked to a lesser degree, such that a stiffness of the first region of the deformable element is different from a stiffness of the second region.

In some examples, a configuration of the non-uniform stiffness may be at least partially based on an inter-pupillary distance between a particular user's eyes. The deformable element may include a liquid diffusion barrier. The deformable element may exhibit an antireflective property.

In some embodiments, the present disclosure may include methods of fabricating an optical lens assembly. In accordance with such methods, a deformable element may be formed to exhibit a stiffness in a first region that is different from a stiffness in a second region. The deformable element may be coupled to a structural support element, and a deformable medium may be disposed between the deformable element and the structural support element.

In some examples, a coating may be applied to at least a portion of a base element of a deformable element. The coating, when applied to a base element of the deformable element, may cause the deformable element to exhibit the stiffness in the first region that is different from the stiffness in the second region. A solvent may be dried to harden the coating, and/or the coating may be cured to harden the coating. Curing the coating may include applying heat to the coating, applying actinic radiation to the coating, and/or inducing step-growth polymerization to a material of the coating. In some examples, the coating may not be applied to the second region of the base element and may be applied to the first region of the base element such that the stiffness of the first region is greater than the stiffness of the second region. In some examples, a thickness of the coating in the first region may be greater than a thickness of the coating in the second region, and the stiffness of the first region may be greater than the stiffness of the second region.

In additional embodiments, methods of fabricating an optical lens assembly may include determining a profile of a coating to be applied to a base element of a deformable element to achieve an optical property, applying the coating to the base element to substantially achieve the profile, coupling the deformable element to a structural support element, and disposing a deformable medium between the deformable element and the structural support element. The coating may cause a stiffness of a first region of the deformable element to be different from a stiffness of a second region of the deformable element.

In some examples, applying the coating may include inkjet printing a material on at least a portion of a surface of the base element. In additional examples, applying the coating may include spin-coating a variable-thickness layer of material on at least a portion of a surface of the base element.

Features from any of the above-mentioned embodiments may be used in combination with one another in accordance with the general principles described herein. These and other embodiments, combinations, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 1A is a cross-sectional side view of an optical lens assembly in a neutral, non-actuated state, according to some embodiments of the present application.

Figure 1B:
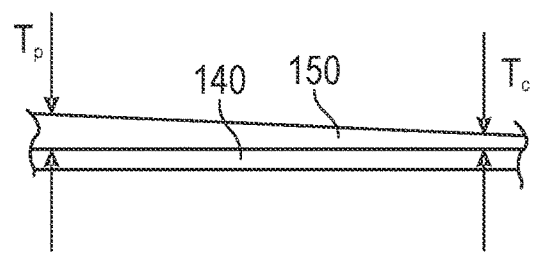
FIG. 1B is a detailed cross-sectional side view of a portion of the optical lens assembly of FIG. 1A, as indicated at the circle A of FIG. 1A.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, combinations, and alternatives falling within the scope of the appended claims.

DETAILED DESCRIPTION OF EXAMPLE EMBODIMENTS

The present disclosure is generally directed to optical lens assemblies, head-mounted displays ("HMDs") including the same, and related methods. As will be explained in greater detail below, embodiments of the present disclosure may include optical lens assemblies with a deformable element having a non-uniform stiffness. For example, a non-uniform coating may be applied to a base element of the deformable element to cause the deformable element to have a non-uniform stiffness. Such coatings may improve control of optical properties of the optical lens assemblies and may improve manufacturing of the optical lens assemblies, as detailed below.

Figure 6:
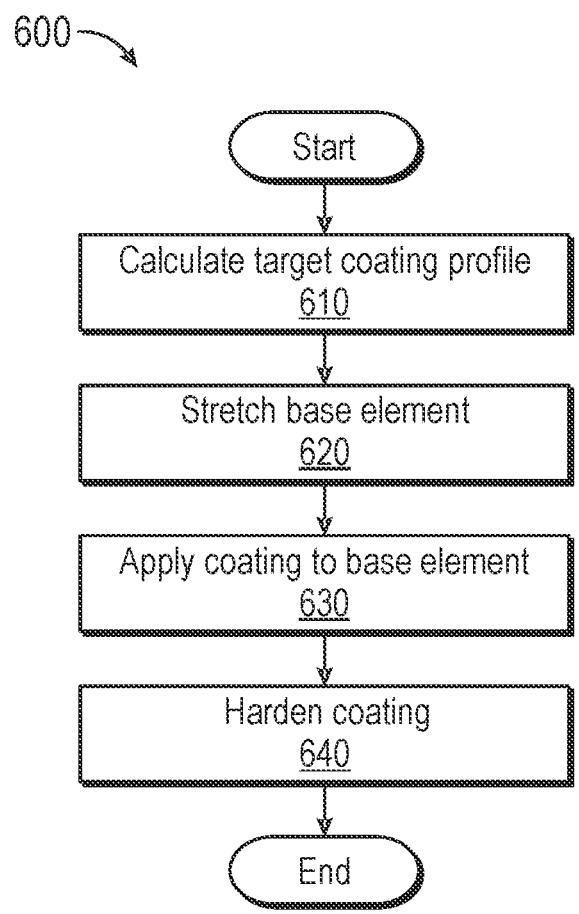
FIG. 6 is a flow diagram of a method of fabricating an optical lens assembly according to some embodiments of the present disclosure.
Figure 7:
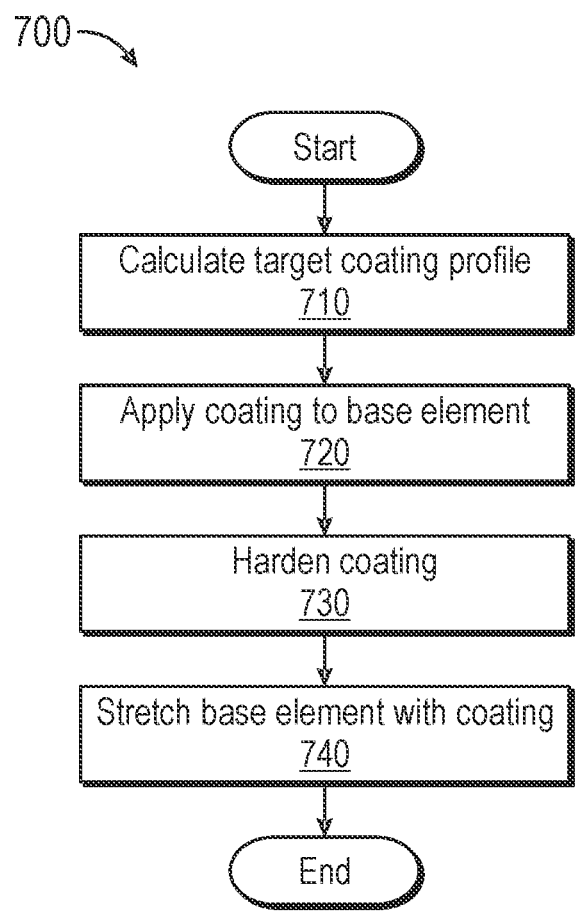
FIG. 7 is a flow diagram of another method of fabricating an optical lens assembly according to some embodiments of the present disclosure.

The following will provide, with reference to FIGS. 1A-1C and 2, detailed descriptions of example optical lens assemblies that include a deformable element having a non-uniform stiffness. The description of FIG. 3 relates to an embodiment of an HMD that includes at least one optical lens assembly according to the present disclosure. The following will also provide, with reference to FIGS. 4 and 5, detailed descriptions of additional examples of deformable elements having non-uniform stiffnesses. With reference to FIGS. 6 and 7, this disclosure will provide detailed descriptions of various methods of fabricating such optical lens assemblies.

FIG. 1A shows a cross-sectional side view of an optical lens assembly 100 in a neutral, non-actuated state. The optical lens assembly 100 may include a rigid or semi-rigid structural support element 110 and a deformable optical element 120 (including a deformable element 122 and a deformable medium 124) positioned over the structural support element 110. An outer periphery 130 of the deformable element 122 may be coupled (e.g., bonded, adhered) to the structural support element 110, and the deformable medium 124 may be disposed within a cavity defined between the deformable element 122 and the structural support element 110. The outer periphery 130 of the deformable element 122 may define an edge seal to contain the deformable medium 124. In additional embodiments, a separate edge seal material may be positioned between and couple the deformable element 122 and the structural support element 110. A force distributor ring 132 may be positioned over the deformable element 122 proximate the outer periphery 130 of the deformable element 122.

Each of the structural support element 110, the deformable element 122, and the deformable medium 124 may be substantially transparent to allow light to pass therethrough to an eye of a user. Accordingly, at least portions of the structural support element 110 and the deformable optical element 120 may be positioned in an optical aperture of the optical lens assembly 100, which may refer to a portion of the optical lens assembly 100 that allows the passage of light to a user's eye.

In some examples, the phrase "substantially transparent" may refer to an element exhibiting greater than about 20% transmissivity and less than about 10% haze in the visible light spectrum. In some examples, the term "substantially," in reference to a given parameter, property, or condition may generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 90% met, at least 95% met, at least 99% met, etc. In some examples, the phrase "deformable optical element" may refer to an element (including one or more materials or sub-elements) that is configured to be deformed to alter an optical property (e.g., an accommodative property or an adaptive optical property) of the optical lens assembly. In some examples, the term "accommodative" or "accommodation" may refer to changing an optical power. In some examples, the term "adaptive" may refer to tunability for providing control, compensation, and/or correction of wave front errors such as distortion and aberration(s).

The structural support element 110, deformable optical element 120, and force distributor ring 132 may be coupled to and supported by a housing 134 (e.g., an eyeglass frame element, a VR headset frame element, etc.). In some embodiments, the housing 134 may also support a display element for displaying an image to the user. In some examples, the housing 134 may support the optical lens assembly 100 on a side of the housing 134 proximate the user's eye, and another optical lens assembly 100 on an opposing side of the housing 134 distant from the user's eye. In such examples, the (proximal) optical lens assembly 100 may be used for adjusting the user's view of an image on the display element, and the other (distal) optical lens assembly 100 may be used for counteracting the adjustments of the optical lens assembly 100 with respect to the user's view of a surrounding real-world environment.

In FIG. 1, the deformable element 122 and deformable medium 124 are shown in a neutral, non-actuated state. In the non-actuated state, an upper surface of the deformable element 122 may have a substantially planar shape, and the optical lens assembly 100 may be configured and positioned to not substantially alter an image or view passing through the optical lens assembly 100. In other words, the non-actuated state may be a substantially zero-optical power state.

The structural support element 110 may be or include a substantially transparent material with a higher relative rigidity than the deformable element 122 and the deformable medium 124. By way of example, the structural support element 110 may be or include one or more of a glass material, a sapphire material, a crystal material (e.g., quartz), a polycarbonate material, another polymer material, or a non-polymeric material. The structural support element 110 may provide a protective barrier for the user's eye, for the deformable optical element 120, and for other components of the optical lens assembly 100 (e.g., a display element, an actuator, etc.). The structural support element 110 may also include an eye-tracking element, which may be configured for estimating an inter-pupillary distance of the user's eyes, a gaze distance, and/or a focal point. The eye-tracking element, if present, may include a selective-transmission element that transmits light having a selected property and that does not transmit light that does not have the selected property. For example, the structural support element 110 may include a coating or material that allows visible light to pass while reflecting non-visible light (e.g., infrared light). In this example, an infrared light source may direct infrared light to the structural support element 110, which may be reflected onto the user's eye. An infrared camera may detect infrared light that is reflected from the user's eye and back to the structural support element 110, to track the user's eye.

As shown in FIG. 1, the structural support element 110 may be a substantially planar element that does not substantially alter an image viewed through the structural support element 110. In other embodiments, the structural support element 110 may include a corrective ophthalmic lens (e.g., a positive-optical power (i.e., magnifying) lens, a negative-optical power (i.e., diminishing) lens, a lens for correction of an aberration, etc.), or another optical lens element. Optionally, an anti-reflective coating may be applied to the structural support element 110. The outer periphery 130 of the deformable element 122 may be directly or indirectly coupled to the structural support element 110, which may define a cavity therebetween for containing the deformable medium 124.

FIG. 1B illustrates a detailed cross-sectional view of the deformable element 122. Referring to FIGS. 1A and 1B, in some examples, the deformable element 122 may include a substantially transparent, flexible base element 140 and a substantially transparent, flexible coating 150 applied to at least a portion of a surface of the base element 140. By way of example and not limitation, the base element 140 and the coating 150 of the deformable element 122 may each include at least one of a polymer material (e.g., a thermoset polymer, a thermoplastic polymer, an elastomer, a silicone material, polydimethylsiloxane, a polyurethane elastomer, a fluoropolymer material, polyvinylidene fluoride or a copolymer thereof, a polyolefin material, a polyacrylate material, etc.), a ceramic material, a glass material, a crystalline (e.g., substantially single-crystal) material, or a composite material. The base element 140 may be include a single material or a multi-layer structure. The base element 140 and/or the coating 150 may include a barrier material for controlling gas or liquid diffusion, an anti-reflective material, or a combination thereof. In some embodiments, the base element 140 and/or the coating 150 may be held under tension by the force distribution ring 132, which may also function as a pre-tensioning ring. In some examples, a material of the base element 140 and/or of the coating 150 may include a flexible, transparent, water-impermeable material, such as clear and elastic polyolefins, polycycloaliphatics, polyethers, polyesters, polyimides and/or polyurethanes, for example, polyvinylidene chloride films, including commercially available films.

The coating 150, if present, may be selectively applied to the base element 140 to result in the deformable element 122 having a non-uniform stiffness (e.g., a first region exhibiting a first stiffness, and a second region exhibiting a second, different stiffness). In some embodiments, an elastic modulus of the deformable element 122 may also be non-uniform across its area, such as in embodiments in which the coating 150 is or includes a different material from the base element 140.

For example, as illustrated in FIG. 1B, the coating 150 may have a non-uniform thickness, with a peripheral thickness $T_P$ being greater than a central thickness $T_C$. Alternatively or additionally, the coating 150 may be applied to one or more portions (e.g., a peripheral portion) of the base element 140, while one or more additional portions (e.g., a central portion) of the base element 140 may be substantially free of the coating 150. The region(s) of the deformable element 122 having a relatively higher-thickness coating 150 or including the coating 150 may exhibit a relatively higher stiffness than the regions(s) having a relatively lower-thickness coating 150 or lacking the coating 150. The selective application of the coating 150 may enable tailoring of physical (e.g., mechanical) properties of the deformable element 122 and corresponding deformable optical element 120, such as to substantially achieve a target deformation profile upon actuation, as further described below.

In some examples, the coating 150 may be applied to the base element 140 in a manner that causes the deformable element 122 to have an aspherical shape, a spherical shape, or a parabolic shape when the base element 140 is in a relaxed, non-actuated state, and/or the deformable element 122 to have an aspherical shape, spherical shape, or parabolic shape when the deformable element 122 is actuated and deformed.

Figure 1C:
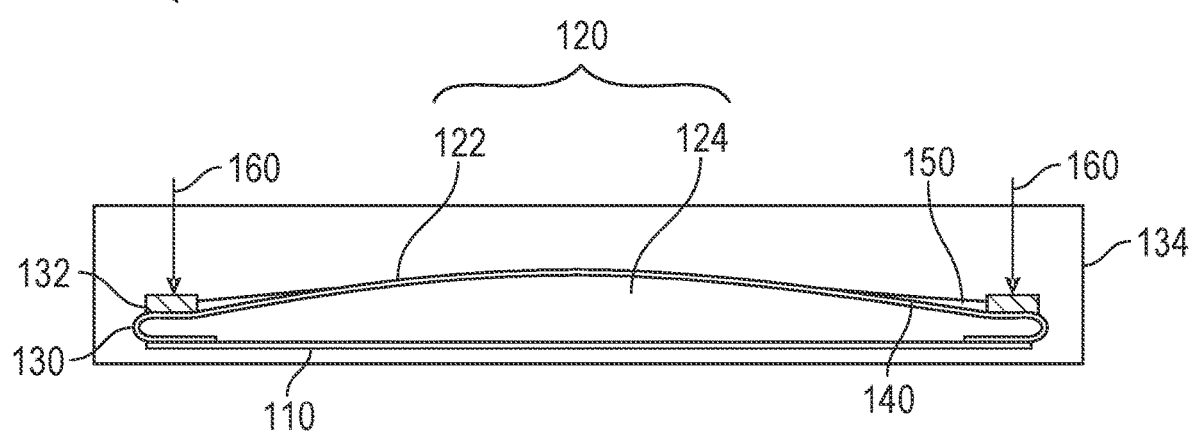
FIG. 1C is a cross-sectional side view of the optical lens assembly of FIG. 1A in an actuated state.

Although FIGS. 1A-1C illustrate the non-uniform coating 150 on the base element 140, the present disclosure is not so limited. In additional embodiments, the deformable element 122 may have a non-uniform stiffness without the non-uniform coating 150 on the base element 140. For example, the base element 140 may have a substantially uniform thickness, but may exhibit different mechanical properties (e.g., stiffness, elastic modulus, etc.) in different regions thereof. In one such example, the base element 140 may include a polymer material that is cross-linked in a first region, and is not cross-linked or is cross-linked to a lesser degree in a second region. The higher cross-linking in the first region may result in a higher stiffness in the first region, compared to the second region. The first region may be selectively cross-linked by, for example, exposing the first region to actinic radiation and/or heat, while shielding the second region from the actinic radiation and/or heat to reduce or inhibit cross-linking in the second region. In some embodiments, both the coating 150 may be present and the coating 150 and/or base element 140 may exhibit selective cross-linking, as described above.

The deformable medium 124 may be a substantially transparent material with mechanical properties that allow for deformation upon actuation of the optical lens assembly 100. By way of example and not limitation, the deformable medium 124 may be or include a gas (e.g., air, nitrogen, etc.), a liquid (e.g., water, degassed water, mineral oil, saline solution, a high-refractive index liquid, etc.), a polymer material, a gel (e.g., a silicone gel), or a foam (e.g., a silica aerogel), etc.

FIG. 1C shows the optical lens assembly 100 in a convex actuated state, with the deformable element 122 being deformed to a desired shape (e.g., convex). The deformation of the deformable element 122 may result from a downward (in the perspective of FIG. 1C) actuation force 160 on the force distributor ring 132 from an actuator (e.g., an electromechanical actuator). In the view of FIG. 1C, the force distributor ring 140 has been forced downward by the actuation force 160 to push a portion of the deformable medium 124 from proximate the outer periphery 130 into a central region of the deformable optical element 120, increasing a pressure proximate to the outer periphery 130, and causing a central region of the deformable element 122 to bulge upward (in the perspective of FIG. 1C). The shape of the actuated deformable element 122 may be aspherical, spherical, or parabolic, for example.

The presence and configuration of the coating 150 on the base element 140 may affect the deformation profile of the deformable element 122, such as by exhibiting a higher stiffness in a first region where the coating 150 is present or is relatively thicker and a lower stiffness in a second region where the coating 150 is not present or is relatively thinner. Accordingly, the coating 150 may be applied to the base element 140 to tailor the deformation profile of the deformable element 122 upon actuation, as desired. For example, the coating 150 may be applied to the base element 140 in a relatively higher thickness in a first region where less deformation is desired, and in a relatively lower thickness in a second region where more deformation is desired. In some examples, any relational term, such as "first," "second," "over," "downward," "upward," etc., may be used for clarity and convenience in understanding the disclosure and accompanying drawings, and does not necessarily connote or depend on any specific preference, orientation, or order, except where the context clearly indicates otherwise.

In some examples, the term "electromechanical actuator" may refer to a piezoelectric material or device, an electroactive polymer, an electrostrictive polymer, a shape memory alloy, a voice coil, a pneumatic actuator, an electromagnetic motor (including for example a servo motor, a stepper motor, a DC motor, or a similar motor), a hydraulic actuator, or a combination thereof. In some examples, the term "electroactive" may refer to a property of a material or composite material that deforms in response to an application of electrical energy (e.g., a voltage) and may generate electrical energy when strained or deformed. Example electroactive materials include piezoelectric materials, electrostrictor materials, dielectric elastomers, and ionic polymer conductors.

Although FIG. 1C illustrates deformation of the deformable optical element 120 resulting from the actuation force 160 acting on the force distributor ring 132, the present disclosure is not so limited. For example, in some embodiments, the deformable element 122 may be or include an electroactive material that may deform in response to the application of a sufficient voltage. In such examples, the force distributor ring 132 may be absent or may be configured as a pre-tensioning ring.

Figure 2:
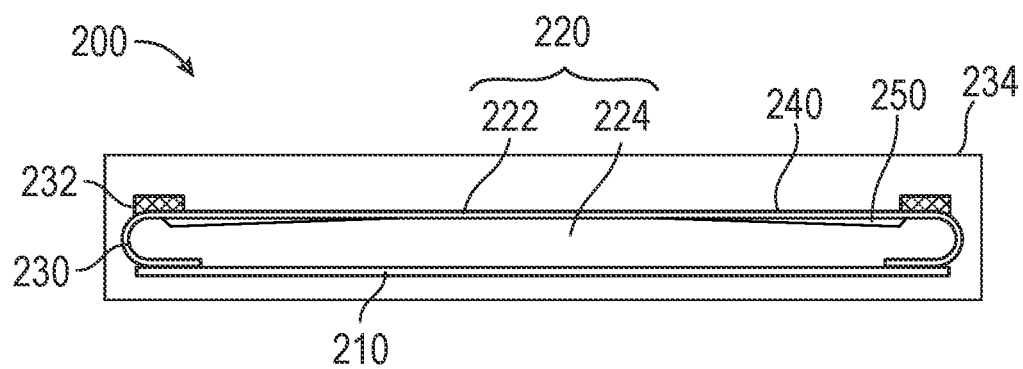
FIG. 2 is a cross-sectional side view of an optical lens assembly according to another embodiment of the present application.

FIG. 2 illustrates another embodiment of an optical lens assembly 200 that includes a structural support element 210 and a deformable optical element 220 including a deformable element 222 and a deformable medium 224. An outer periphery 230 of the deformable element 222 may be coupled to the structural support element 210, and may form an edge seal to contain the deformable medium 224 within a cavity defined between the deformable element 222 and the structural support element 210. In some embodiments, a force distributor ring 232 may be positioned over the deformable element 222 at or near the outer periphery 230. A housing 234 may support the other components of the optical lens assembly 200. The deformable element 222 may include a base element 240 and a coating 250 that is selectively applied to a surface of the base element 240. The embodiment described above with reference to FIGS. 1A-1C includes a coating 150 that is applied to a surface of a base element 140 on a side of the base element 140 opposite the deformable medium 124. In the embodiment shown in FIG. 2, the coating 250 may be selectively applied to an internal surface of the base element 240 facing the deformable medium 124.

Figure 3:
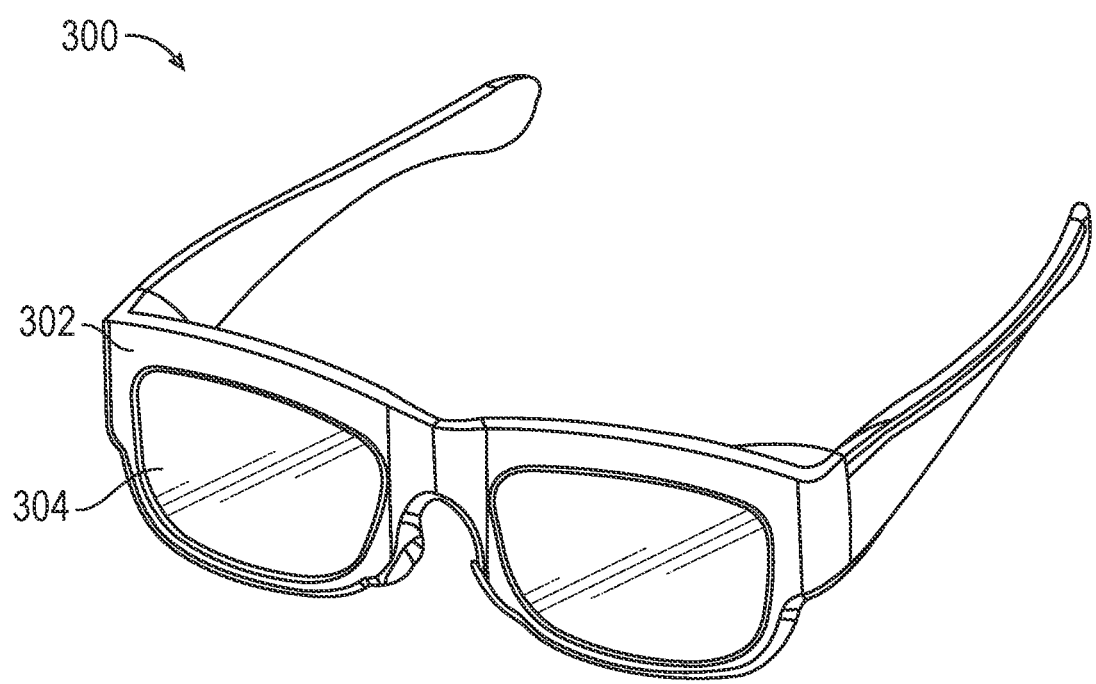
FIG. 3 is a perspective view of an HMD according to some embodiments of the present disclosure.

FIG. 3 illustrates an example HMD 300 (e.g., AR glasses, VR glasses) capable of incorporating the optical lens assemblies (e.g., the optical lens assemblies 100, 200) described herein. In one example, the HMD 300 may be dimensioned to be worn on a head of a user. The HMD 300 may include a frame element 302 for supporting at least one deformable optical lens assembly 304 according to the present disclosure. In some embodiments, the optical lens assembly(ies) 304 may be tailored to or selected in consideration of a particular user's eye or eyes (e.g., to position an optical center of the optical lens assembly(ies) 304 based on an inter-pupillary distance of the user, to correct for vision impairments of the user, etc.). In addition to supporting the optical lens assembly(ies) 304, the frame element 302 may also support other elements, such as an actuator, a driver circuit for the actuator, a power supply element (e.g., a battery), a communication component (e.g., a component for communication via Wi-Fi, BLUETOOTH, near-field communications ("NFC"), etc.), a display element, a graphics processing unit for rendering an image on the display element, an image sensor (e.g., a camera), an eye-tracking element, etc. As shown in FIG. 3, the optical lens assembly 304 may have an asymmetric shape. In other embodiments, the optical lens assembly 304 may have a symmetric (e.g., circular) shape. In addition, the HMD 300 may have a different shape and design than is shown in FIG. 3, such as in the form of a VR headset or another shape that suits user preferences or a particular application. The optical lens assembly 304 may be or include any of the optical lens assemblies described in this application.

Figure 4:
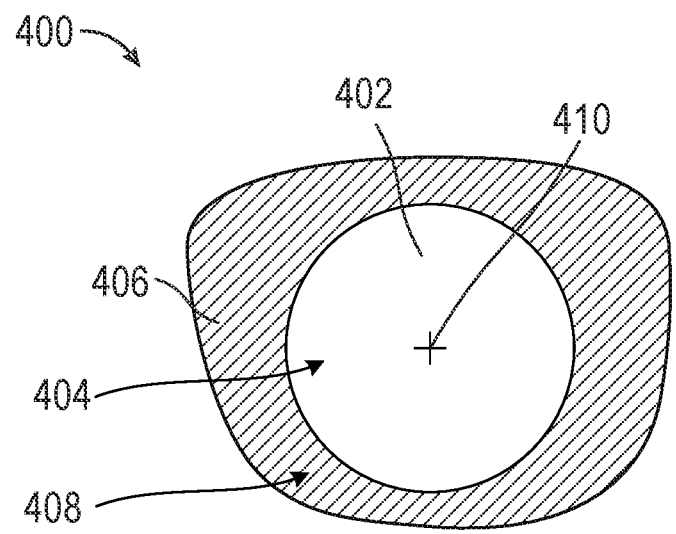
FIGS. 4 and 5 illustrate schematic plan views of optical lens assemblies according to various embodiments of the present disclosure.

FIG. 4 illustrates a schematic plan view of an optical lens assembly 400 that may include a substantially transparent, deformable base element 402 in a central region 404 and a substantially transparent, deformable coating 406 on a surface of the base element 402 in a peripheral region 408. The coating 406 in the peripheral region may have a uniform thickness or a non-uniform thickness. In the central region 404, the base element 402 may lack the coating 406. The central region 404 lacking the coating 406 may be substantially centered about a geometric center 410 of the optical lens assembly 400, as shown in FIG. 4. In this example, an optical axis of the optical lens assembly 400 defined upon actuation and deformation may substantially coincide with the geometric center 410. The coating 406 may be applied to the surface of the base element 402 in one or more regions where greater stiffness may be desired, such as to modify optical properties (e.g., accommodative or adaptive properties) and/or mechanical properties (e.g., stiffness) of the optical lens assembly 400 or of portions of the optical lens assembly 400. In some embodiments, the base element 402 and/or coating 406 (if present) may be selectively cross-linked to exhibit a non-uniform stiffness, as discussed above.

Figure 5:
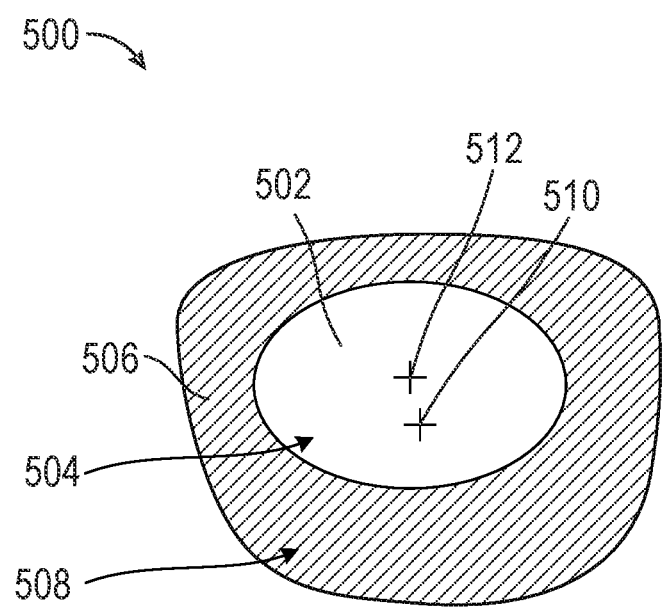

FIG. 5 illustrates a schematic plan view of an optical lens assembly 500 according to another embodiment of the present disclosure. The optical lens assembly 500 may include a substantially transparent, deformable base element 502 in a central region 504 and a substantially transparent, deformable coating 506 on a surface of the base element 502 in a peripheral region 508. The coating 506 in the peripheral region may have a uniform thickness or a non-uniform thickness. In the central region 504, the base element 502 may lack the coating 506. The central region 504 lacking the coating 506 may not be substantially centered about a geometric center 510 of the optical lens assembly 500, as shown in FIG. 5. For example, an optical axis 512 of the optical lens assembly 500 defined upon actuation and deformation may not coincide with the geometric center 510, such as to account for an inter-pupillary distance of a user or a set of users. In addition, the central region 504 may not be circular, but may be elliptical (as illustrated in FIG. 5, for example), square, rectangular, irregular, etc., such as to achieve a desired mechanical strain profile and/or optical properties. For example, the shape of the central region 504 lacking the coating 506 may be selected to correct for an aberration (e.g., astigmatism, etc.) of a user or set of users, and/or to counter the negative effects of gravity sag. In some embodiments, the base element 502 and/or coating 506 (if present) may be selectively cross-linked to exhibit a non-uniform stiffness, as discussed above.

FIG. 6 is a flow chart illustrating a method 600 of fabricating an optical lens assembly. In operation 610, a target coating profile (including thickness(es) and/or locations for presence or absence) of the coating may be calculated. Factors for consideration in calculating the target coating profile may include, by way of non-limiting example, a desired optical power change, a target optical axis location, a target inter-pupillary distance, a target stiffness profile, a target curvature under a given actuation force, etc. The calculation may include measuring a shape of the base element of the deformable optical element when it is deformed into a curved state, fitting the curved shape in a simulation program, defining a desired lens shape, defining coating properties when the coating is in a hardened state, and solving for the target coating profile. Alternatively, another method may be used for calculating the coating profile such as trial and error or applying a coating distribution that will cause the shape of the lens to be improved relative to the uncoated shape.

As indicated in operation 620, the base element may be stretched. Depending on a desired application, the level of stretching may be at least about 5%, 7%, 10%, or 12% or more. The stretched base element may be held by a pre-tensioning ring (e.g., a force-distribution ring) or by an intermediate mechanical fixture, for example.

In operation 630, the coating may be applied to the stretched base element by one of a number of processes, including by inkjet printing, spin coating, or spray coating (e.g., aerosol spray or electrospray coating), for example. In some embodiments, the coating may be applied through a stencil or mask to selectively apply the coating in one or more regions of the base element, while leaving one or more additional regions substantially free of the coating. The base element may be positioned over a non-planar substrate while applying the coating, such as to allow the coating to be relatively thicker in one or more regions and thinner in one or more additional regions due to the effects of gravity.

By way of example and not limitation, the coating may initially (i.e., at the time of application to the base element) be or include a polymer material that is dissolved in a solvent. Example suitable polymers include polysilicones, polyolefins (including cyclic polyolefins), polyacrylates (including polyacrylic acid, polymethylmethacrylate, polyethylmethacrylate, or copolymers thereof), polyesters (including polyethylene terephthalate, polyethylene isophthalate, polyethylene naphthalate, and copolymers thereof), polycarbonates, polystyrenes, and other polymers or combinations thereof. The material of the coating may be selected to have a refractive index that is at least substantially similar to (such as within about 3%, within about 2%, within about 1%, or within about 0.5%) a refractive index of the deformable medium and/or of the base element.

The solvent for the coating may be selected to dissolve the coating polymer, but may exhibit less solubility or insolubility for the material making up the base element. In some embodiments one or more treatments may be first applied to the base element to reduce or inhibit potential deleterious effects from exposure to the solvent. Example suitable solvents include alkanes, aromatic solvents such as toluene, dipolar aprotic solvents such as N-methyl-2-pyrrolidone, fluorocarbons including fluoroalkanes, ketones such as methyl ethyl ketone, and other solvents. The selected solvent may depend on the solubility of the polymer selected for the coating.

As indicated in operation 640, the coating may be hardened (e.g., cured). In some examples, the coating may be or include a curable, free-radically polymerized monomer such as a styrene or an acrylate. Curing may be initiated thermally, by actinic radiation, or by a combination thereof. In additional examples, the curing may include step-growth, such as in the case of coatings including a polyester or a polyurethane. In some examples, the coating may be hardened by drying (e.g., evaporating) a solvent. The selected hardening technique may depend on the selected polymer and/or associated solvent.

In some embodiments, after hardening, at least a portion of the coating may be diffused into the base element. In some embodiments, at least a portion of the coating may be crosslinked with the base element. In some examples, the material of the coating may exhibit a mechanical stress that is within about five percent of a mechanical stress of the base element and/or less than about ninety-five percent of a mechanical stress of the base element. Stress in the coating may be determined by measuring the dimensions of a region of the coated base element, sectioning the coating from the base element, and re-measuring the dimensions of the coating when unconstrained (i.e., when removed from the base element). Stress in the base element may be determined by measuring the dimensions of a region of the coated base element, sectioning the base element from the coating, and re-measuring the dimensions of the base element when unconstrained (e.g., when the coating is removed and/or when any pre-tensioning is relaxed).

In addition, the base element and coating may be coupled to a structural support element, such as directly bonded or adhered or indirectly coupled via a separate edge seal material. A deformable medium may be disposed between the deformable element (e.g., the base element and coating) and the structural support element.

FIG. 7 is a flow diagram illustrating a method 700 of fabricating an optical lens assembly according to another embodiment of the present disclosure. The method 700 may include an operation 710 including calculating a target coating profile. As shown in operation 720, a coating may be applied to a base element, which may or may not be pre-stretched. In operation 730, the coating may be hardened (e.g., cured). The base element and hardened coating may be stretched, as indicated in operation 740. The procedures and operations in the method 700 may be similar to those described above with reference to FIG. 6, but may be performed in a different order than the method 600 described with reference to FIG. 6. The method 700 may be suitable for use with a coating material that is capable of withstanding stretching without mechanical failure, for example.

Accordingly, disclosed are optical lens assemblies, head-mounted displays, and associated methods that include a deformable element with a non-uniform coating, such that a stiffness of the deformable element in a first region may be different from stiffness in a second region. As detailed above, the non-uniform coating may enable control over a deformation profile of the optical lens assemblies when actuated. In addition, methods described herein may improve manufacturing of the optical lens assemblies with such coatings, such as to reduce a manufacturing cost, reduce variability, and increase customization options.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications, combinations, and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical lens assembly, comprising:
   a structural support element;
   a deformable element coupled to the structural support element, the deformable element comprising:
      a base element that, when deformed, alters an optical property of the optical lens assembly; and
      a coating applied to a first region of a surface of the base element and not applied to a second region of the surface of the base element, such that a stiffness of the first region of the deformable element is greater than a stiffness of the second region of the deformable element; and
   a deformable medium positioned between the deformable element and the structural support element.

2. The optical lens assembly of claim 1, wherein the structural support element comprises a transparent material.

3. The optical lens assembly of claim 2, wherein the structural support element comprises an eye-tracking element.

4. The optical lens assembly of claim 1, wherein the coating in the first region exhibits a variable thickness.

5. The optical lens assembly of claim 4, wherein a peripheral thickness of the coating proximate a periphery of the optical lens assembly is greater than a central thickness of the coating that is radially inward from the periphery of the optical lens assembly.

6. The optical lens assembly of claim 1, wherein the coating is applied to the base element in a manner that causes at least one of:
   the deformable element to have an aspherical shape, a spherical shape, or a parabolic shape when the deformable element is in a relaxed state; or
   the deformable element to have the aspherical shape, a spherical shape, or a parabolic shape when the deformable element is actuated and deformed.

7. The optical lens assembly of claim 1, wherein at least a portion of the coating is diffused into the base element.

8. The optical lens assembly of claim 1, wherein at least a portion of the coating is crosslinked with the base element.

9. The optical lens assembly of claim 1, wherein:
the coating is applied to a surface of the base element facing the deformable medium; and
a refractive index of the coating is at least substantially similar to a refractive index of the deformable medium.

10. The optical lens assembly of claim 1, wherein the coating is applied to a surface of the base element opposite the deformable medium.

11. The optical lens assembly of claim 1, wherein a mechanical stress of the coating is at least one of:
within about five percent of a mechanical stress of the base element; or
less than about ninety-five percent of a mechanical stress of the base element.

12. The optical lens assembly of claim 1, wherein a location of the first region is at least partially based on an inter-pupillary distance between a particular user's eyes.

13. The optical lens assembly of claim 1, wherein the coating is flexible.

14. Eyeglasses, comprising:
at least one optical lens assembly, comprising:
a substantially transparent structural support element;
a substantially transparent deformable element coupled to the structural support element, the deformable element comprising a base element and a coating applied to a first region of a surface of the base element, wherein a second region of the surface of the base element lacks the coating, such that a stiffness of the first region of the base element is greater than a stiffness of the second region of the deformable element; and
a substantially transparent deformable medium disposed between the deformable element and the structural support element; and
a frame element for supporting the optical lens assembly on a user's head.

15. The eyeglasses of claim 14, wherein the coating comprises at least one of:
a polymer material;
a ceramic material;
a glass material;
a crystalline material; or
a composite material.

16. The eyeglasses of claim 14, further comprising an actuator for deforming the deformable element to adjust at least one optical property of the at least one optical lens assembly.

17. The eyeglasses of claim 14, wherein the coating comprises a different material from the base element.

18. The eyeglasses of claim 14, wherein the second region lacking the coating is centered about a geometric center of the optical lens assembly.

19. The eyeglasses of claim 14, wherein the second region lacking the coating is not centered about a geometric center of the optical lens assembly.

20. A method of fabricating an optical lens assembly, the method comprising:
determining a profile of a coating to be applied to a base element of a deformable element to achieve an optical property;
applying the coating to a first region of a surface of the base element to substantially achieve the profile, wherein the coating causes a stiffness of the first region of the deformable element to be greater than a stiffness of a second region of the deformable element lacking the coating;
coupling the deformable element to a structural support element; and
disposing a deformable medium between the deformable element and the structural support element.

* * * * *